United States Patent

Takeda et al.

[15] 3,686,581

[45] Aug. 22, 1972

[54] ELECTRIC SIGNAL AMPLIFYING APPARATUS

[72] Inventors: Ikuo Takeda, 2-24 Sekimachi; Takashi Suzuki, c/o Takeda Riken Industry Co. Ltd., 1-chome, Asachicha; Hikaru Furukawa, 2296, Ohoizumigakuen-machi, all of Nerima-ku, Tokyo, Japan

[22] Filed: March 31, 1970

[21] Appl. No.: 24,210

[30] Foreign Application Priority Data

April 1, 1969 Japan ......................44/24391

[52] U.S. Cl. ......................330/63, 330/76, 330/188, 324/43 R

[51] Int. Cl. ................................................H03f 9/00

[58] Field of Search....................324/43 R; 330/63, 8

[56] References Cited

UNITED STATES PATENTS

| | | | |
|---|---|---|---|
| 2,861,242 | 11/1958 | Leavitt | 324/43 |
| 3,040,248 | 6/1962 | Geyger | 324/43 |
| 3,218,547 | 11/1965 | Sung Ching Ling | 324/43 |

*Primary Examiner*—Nathan Kaufman
*Attorney*—William J. Daniel

[57] ABSTRACT

This invention is a signal amplifying apparatus which detects a magnetic flux generated in a magnetic core by an input signal and obtains such output as cancels it.

1 Claim, 1 Drawing Figure

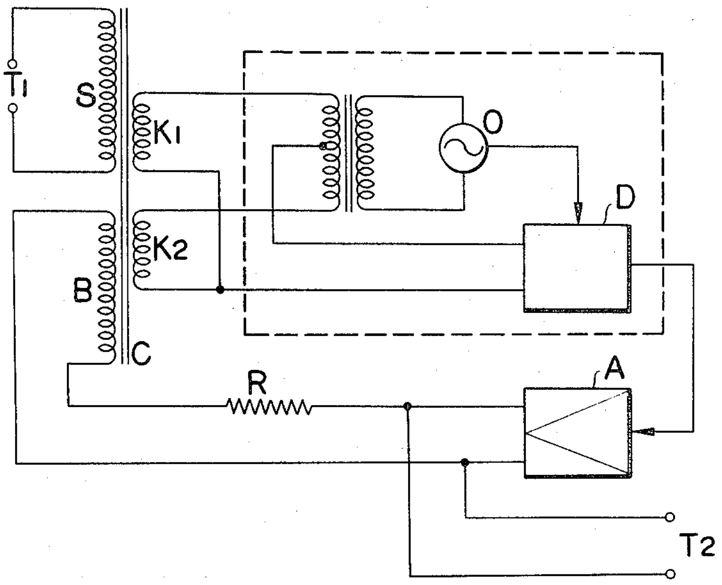
T1
S
K1
O
D
K2
B
C
R
A
T2

ELECTRIC SIGNAL AMPLIFYING APPARATUS

This invention relates to electric signal amplifying apparatus. In the case of amplifying an electric signal, generally vacuum tubes or transistors are used. However, as they are restricted by shot noises and thermal noises of the circuit resistance, it is very difficult to amplify signals as minute as nanovolts with them. A coupling is likely to be produced between the input and output terminals through a feedback circuit, and it is difficult also to completely prevent mutual action with other signal systems.

An object of the present invention is to provide an amplifying apparatus which can easily amplify minute signals and at the same time, particularly, can completely isolate the input and output terminals from each other and from other signal systems.

The accompanying drawing is a circuit diagram of an embodiment of the present invention.

In the embodiment shown in the drawing, a magnetic core C is provided with a signal winding S, a feedback winding B and detecting windings $K_1$ and $K_2$ having the same number of turns connected in series with reverse polarities so that oppositely directed magnetic fluxes may be generated.

The signal winding S is connected to a signal input terminal $T_1$. Further, both ends of the detecting windings $K_1$ and $K_2$ which are oriented on the core in the same direction are connected to opposite ends of the secondary winding of a transformer M. The output of an oscillator O is applied to the primary winding of this transformer M.

The oscillator O sends out an output of a relatively high frequency, at least more than twice as high as the signal frequency to be amplified. Further, the center tap of the secondary winding of the transformer M and the common terminal of the detecting windings $K_1$ and $K_2$ are respectively connected to the input terminals of a demodulator D so that its input may be demodulated with the output of the oscillator O.

Its demodulated output is amplified with any amplifier A such as a transistor or vacuum tube, and this amplified output is applied to the feedback winding B through a resistance. The output terminal of the above mentioned amplifier A is also connected to an output terminal $T_2$.

In the above described apparatus, if, for example, any direct current signal is applied to the terminal $T_1$, an electric current flows in the signal winding S and a magnetic flux in the direction corresponding to the polarity of the current is generated in the magnetic core C. Therefore, when this magnetic flux is not generated, the impedances of the detecting windings $K_1$ and $K_2$ are symmetrical and therefore no input is delivered to the demodulator. However, in the presence of the above mentioned direct current magnetic flux, an unbalance is caused in the symmetry of the windings $K_1$ and $K_2$, and a modulated input proportional to the input signal is applied to the demodulator D. As this input is demodulated with the output of the oscillator O, a direct current voltage having a polarity corresponding to the polarity of the input signal applied to the terminal $T_1$ is delivered to the amplifier A. As this voltage is amplified and is applied the series circuit of the feedback winding B and resistance R, a direct current flows in said winding and magnetic flux is generated in the magnetic core C.

The winding B is connected to the output terminal of the amplifier A so that its magnetic flux may be oppositely directed with to the magnetic flux generated by the current in the signal winding S. Therefore, if the amplifier A has high enough gain, the magnetic fluxes generated by the windings S and B will be stabilized and substantially canceled.

The output of the amplifier A in this state is delivered as the output signal from the terminals $T_2$.

That is to say, if the signal voltage applied to the input terminal $T_1$ is $e_1$, and the resistance of the winding S is $r_1$, a current $i_1$, represented by $$i_1 = e_1/r_1 \qquad (1)$$

flows through the winding S. Further, if the output voltage of the amplifier A, that is, the voltage appearing at the output terminals $T_2$ is $e_0$, the resistance of the winding B is $r_2$ and the value in the resistance R is $r_0$, the current $i_2$ of said winding B is represented by $$i_2 = e_0/(r_0 + r_2) \qquad (2)$$

Therefore, if the numbers of turns of the windings S and B are respectively $n_1$ and $n_2$, the direct current magnetic field $\Delta H$ remaining in the magnetic core C is represented by $$\Delta H = n_1 e_1/r_1 - n_2 e_0/(r_0 + r_2) \qquad (3)$$

As an input corresponding to this differential magnetic field $\Delta H$ is applied to the demodulator D, if the proper coefficient is K and the gain of the amplifier A is $\alpha$, the output voltage $e_0$ of said amplifier is represented by $$e_0 = K\alpha\Delta H \qquad (4)$$

That is to say, $$e_0/K\alpha = n_1 e_1/r_1 - n_2 e_0/(r_0 + r_2) \qquad (5)$$

is obtained from the above mentioned formulas (3) and (4). Therefore, if $K\alpha$ is made large enough so that, $$e_0 = (n_1/n_2)(r_0 + r_2/r_1) \cdot e_1 \qquad (6)$$

holds, then, by selecting the resistance $r_0$ and the ratio of the numbers of turns $n_1$ to $n_2$ to be large, the output voltage $e_0$ which represents the input voltage $e_1$ amplified by a fixed gain can be obtained.

As described above, the apparatus of the present invention serves to detect a magnetic flux generated in a magnetic core by an input signal and to obtain output at a level which will just cancel it.

Therefore, in this apparatus, there is no fear of deteriorating the SN ratio by thermal noises or shot noises and, though there is a noise generated by the Barkhausen effect based on the non-continuous variation of the magnetization in the magnetic core, this noise is so small as to be well below the thermal noise of a resistance smaller than several ohms.

Further, the input side and output side of the circuit are so perfectly isolated from each other with respect of a direct current that there is no problem with common mode noise as in a conventional high sensitivity amplifier. Therefore, with the present apparatus, minute input voltage of the order of nanovolts can be amplified and, at the same time, the potential relation level as between the input and output terminals can be freely selected.

In the embodiment it was explained the manner in which a magnetic flux detecting winding could be used. However, the present invention can be accomplished also by the use of other detecting means, for example a Hall effect magnetic flux detecting element.

What is claimed is:

1. Amplifying apparatus for amplifying an electrical input signal $e_1$ comprising a non-saturating magnetic core, a signal winding having a first number of turns $n_1$ and a resistance $r_1$, the winding being wound on the core and connected to conduct current from said input signal and induce an input flux in the core, a feedback winding having a second number of turns $n_2$ and a resistance $r_2$, the winding being wound on the core in operative relationship with the first winding, amplifier means coupled through a resistance $r_o$ to the feedback winding to pass current therethrough and induce a feedback flux in the core opposed to said input flux, means including flux detecting winding means on the core for detecting magnetic fluxes in said core induced by said signal and feedback windings and operative to deliver a control signal to said amplifier means to continuously maintain the resultant of said fluxes in the core at zero, and apparatus output terminals connected to the output of the amplifier means to deliver an output signal $e_o$ proportional to the feedback current, the relative numbers of turns in the input and feedback windings being different and the apparatus output signal being related to its input signal such that $$e_o = (n_1/n_2)\,(r_o + r_2/r_1)\,e_1 .$$

* * * * *

UNITED STATES PATENT OFFICE
CERTIFICATE OF CORRECTION

Patent No. 3,686,581 Dated August 22, 1972

Inventor(s) Ikuo TAKEDA et al

It is certified that error appears in the above-identified patent and that said Letters Patent are hereby corrected as shown below:

In The Heading of the Patent, insert

-- Assignee: Takeda Riken Industry Company Limited, Tokyo, Japan --.

Signed and sealed this 13th day of March 1973.

(SEAL)
Attest:

EDWARD M.FLETCHER,JR.
Attesting Officer

ROBERT GOTTSCHALK
Commissioner of Patents